(12) United States Patent
Crooks

(10) Patent No.: US 6,781,580 B2
(45) Date of Patent: Aug. 24, 2004

(54) METHODS AND APPARATUS FOR REPLACING AN ELECTRONIC SHELF LABEL BATTERY

(75) Inventor: John Fredrick Crooks, Chamblee, GA (US)

(73) Assignee: NCR Corporation, Dayton, OH (US)

( * ) Notice: Subject to any disclaimer, the term of this patent is extended or adjusted under 35 U.S.C. 154(b) by 424 days.

(21) Appl. No.: 09/918,748

(22) Filed: Jul. 31, 2001

(65) Prior Publication Data

US 2003/0025690 A1 Feb. 6, 2003

(51) Int. Cl.⁷ .................................................. G09G 5/00
(52) U.S. Cl. ........................ 345/211; 345/1.1; 700/300
(58) Field of Search ................ 345/1.1, 211; 340/572.1, 340/691.6, 693.5, 693.7, 10.34; 700/214, 215; 429/7, 90–93; 713/300, 320, 321

(56) References Cited

U.S. PATENT DOCUMENTS

| | | | | |
|---|---|---|---|---|
| 5,448,226 A | * | 9/1995 | Failing et al. | 340/5.91 |
| 6,130,603 A | * | 10/2000 | Briechle | 340/10.34 |
| 6,269,342 B1 | * | 7/2001 | Brick et al. | 705/20 |
| 6,306,538 B1 | * | 10/2001 | Saitoh et al. | 429/96 |

FOREIGN PATENT DOCUMENTS

| | | | | | |
|---|---|---|---|---|---|
| EP | 0 817 142 A1 | * | 1/1997 | | G08B/3/10 |
| JP | 60-027922 | * | 2/1985 | | G06F/1/00 |
| JP | 03-038096 | * | 2/1991 | | H05K/5/02 |
| JP | 10-013897 | * | 1/1998 | | H04Q/7/14 |

* cited by examiner

Primary Examiner—Alexander Eisen
(74) Attorney, Agent, or Firm—Priest & Goldstein, PLLC; Paul W. Martin

(57) ABSTRACT

Systems and techniques for electronic shelf label (ESL) battery replacement are described. A first embodiment includes an ESL having a single battery and two battery compartments. A replacement battery is placed within the empty battery compartment before the old battery is removed. In a second embodiment, an ESL includes a single battery situated in a single battery compartment, and a large value capacitor connected in parallel with the battery which maintains the contents of the ESL's volatile RAM while the single battery is changed. In a third embodiment, an ESL includes two battery compartments, a single battery and a large value capacitor connected in parallel with the battery. In another aspect, an ESL displays instructions for changing the ESL battery. The ESL includes a pushbutton for user input which allows the user to cycle through multiple battery change instructions. These instructions may be stored in locally in the ESL or may be transmitted to the ESL from a host system.

17 Claims, 5 Drawing Sheets

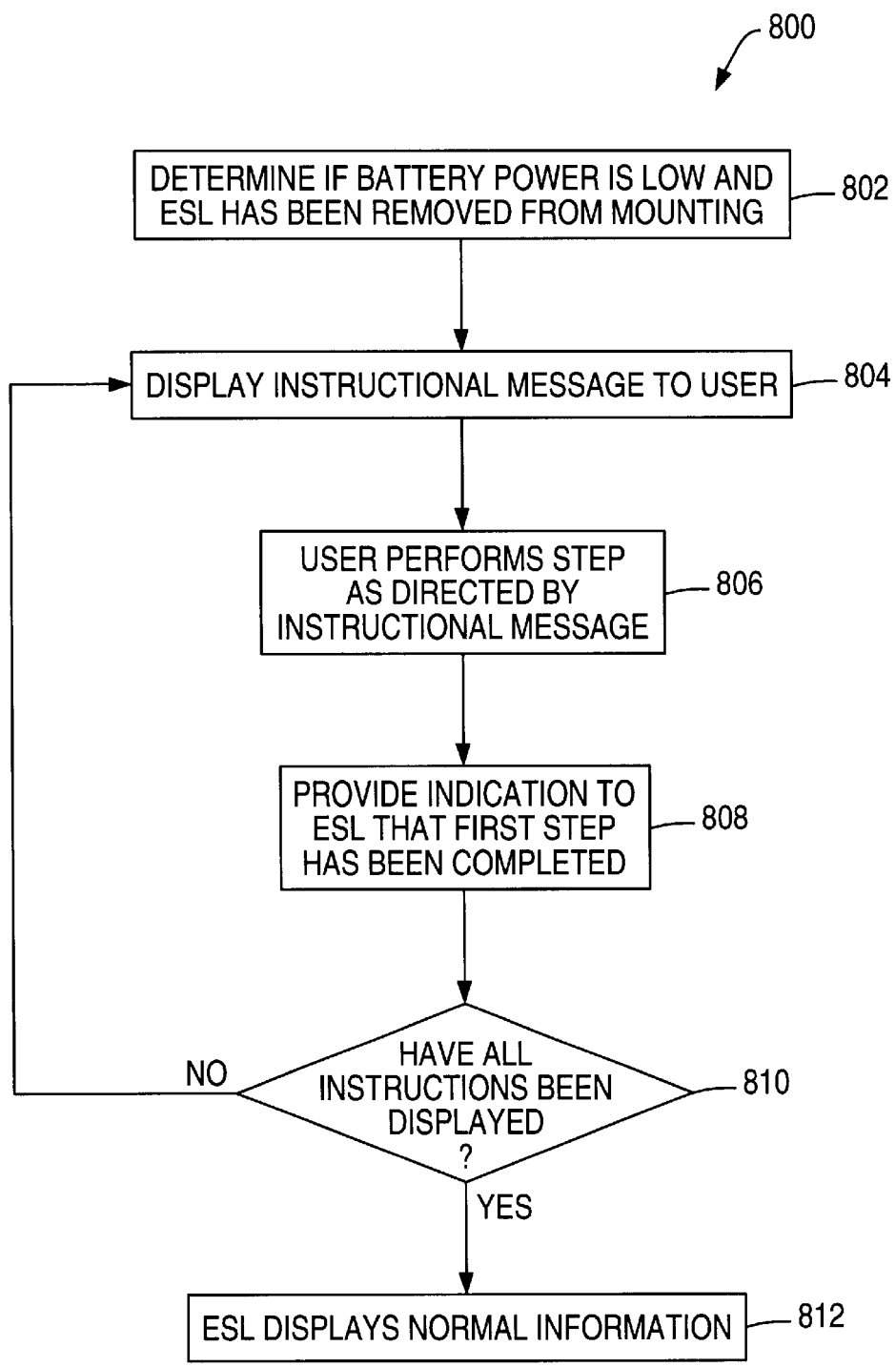

METHODS AND APPARATUS FOR REPLACING AN ELECTRONIC SHELF LABEL BATTERY

CROSS-REFERENCE TO RELATED APPLICATION

The present invention is related to the following commonly assigned and co-pending U.S. application:

Ser. No. 09/250,858, entitled "Electronic Price Label Battery Storage Apparatus And Replacement Method", filed Feb. 17, 1999, and incorporated by reference herein in its entirety.

FIELD OF THE INVENTION

The present invention relates generally to improvements in electronic shelf label (ESL) systems used in transaction establishments. More specifically, the present invention relates to improved methods and apparatus for replacing an ESL battery.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including price change messages, to the ESLs.

Typical ESLs include a battery which provides power for the display and electronic circuitry contained in the ESL, including power to maintain the display contents and ESL identification number information stored in volatile random access memory (RAM). One prior art ESL includes a single battery permanently sealed inside the ESL. This approach reduces the production cost of the ESL, but does not allow a user to replace the battery when its charge is exhausted. Another prior art ESL contains two batteries wired in parallel with a lockout mechanism which discourages the user from removing both batteries at the same time. While this approach allows the user to replace one of the batteries without losing the information stored in the volatile RAM, it also increases the cost of the ESL due to the requirement for two batteries.

SUMMARY OF THE INVENTION

The present invention advantageously provides methods and apparatus for improved electronic shelf label (ESL) battery replacement. A first embodiment of the present invention includes an ESL having a single battery and two battery compartments connected in parallel. A replacement battery is placed within the empty battery compartment before the old battery is removed. In a second embodiment of the present invention, an ESL includes a single battery situated in a single battery compartment, and a large value capacitor connected in parallel with the battery which maintains the contents of the ESL's volatile RAM while the single battery is changed. In a third embodiment of the present invention, an ESL includes two battery compartments, a single battery and a large value capacitor connected in parallel with the battery compartments.

In another aspect, the present invention includes an ESL which displays instructions for changing the ESL battery. The ESL includes a pushbutton for user input which allows the user to cycle through multiple battery change instructions. These instructions may be stored locally in the ESL or may be transmitted to the ESL from a host system.

A more complete understanding of the present invention, as well as further features and advantages of the invention, will be apparent from the following detailed description and the accompanying drawings.

BRIEF DESCRIPTION OF THE DRAWINGS

FIG. 8 illustrates a second method of replacing an ESL battery in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
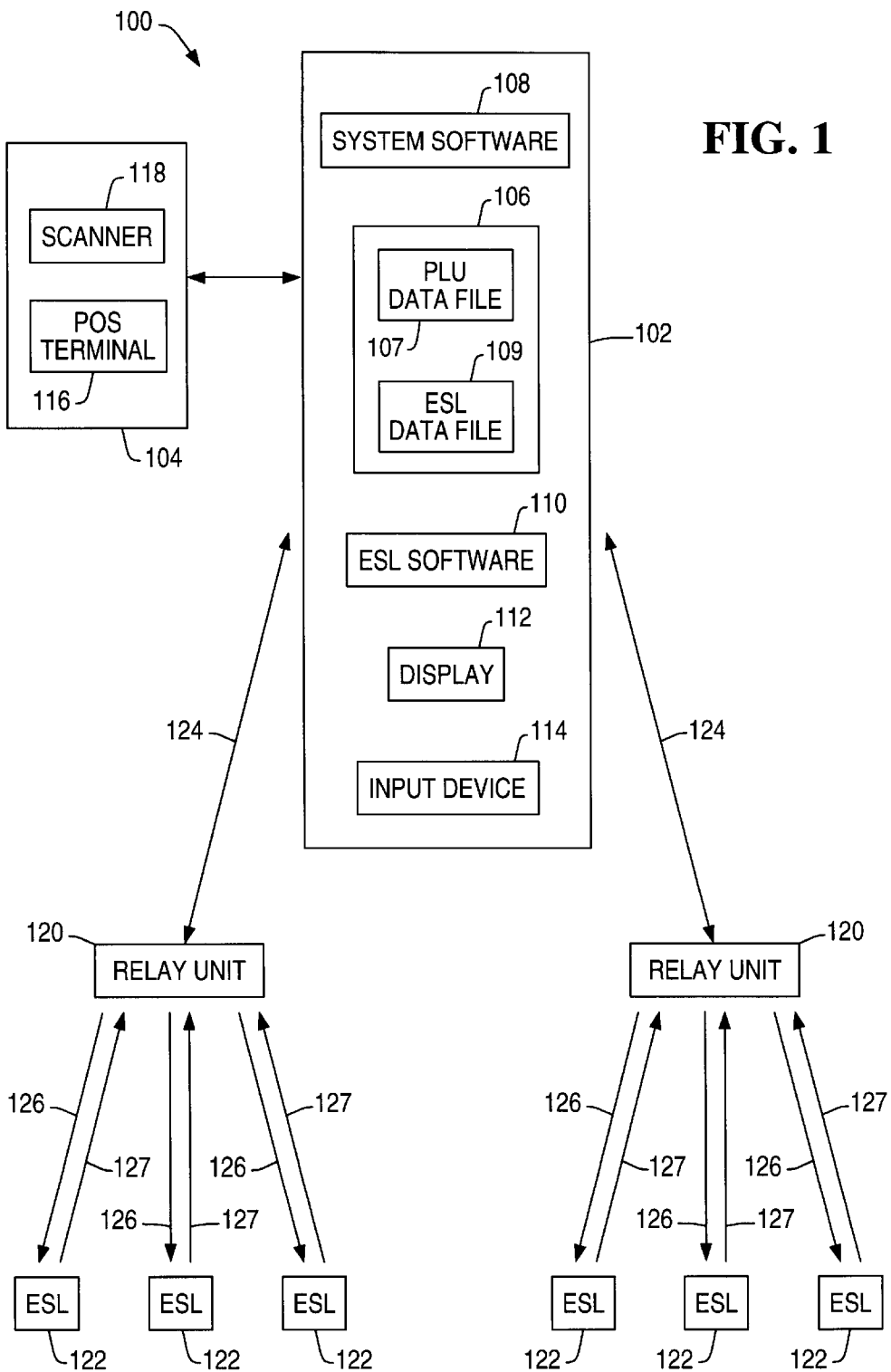
FIG. 1 is a block diagram of a transaction management system in accordance with the present invention.

FIG. 1 shows a transaction management system 100 in accordance with the present invention. The system 100 includes a host computer system 102 and a point-of-service (POS) system 104. Here, components 102 and 104 are shown as separate components that are networked together, but they and their subcomponents may also be combined or divided in various ways. Thus, host computer system 102 may be a POS terminal which doubles as a host computer for a network of other POS terminals.

The host computer system 102 includes a storage medium 106, system software 108, ESL software 110, a display 112 and an input device 114. The storage medium 106 includes a PLU data file 107 which stores item prices which are available for distribution to a POS terminal 116 by the host system 102. Alternatively, provision may be made for a bar code scanner 118 to directly access the PLU data file 107. The storage medium 106 also includes ESL data file 109 which contains item information, such as a PLU number and ESL identification information for each of the ESLs 122. The system 102 executes system software 108 which updates the contents of storage medium 106 and performs other system functions, as described in greater detail below. Input device 114 is preferably a keyboard, but it will be recognized that data can be entered in a variety of alternative manners.

POS system 104 includes bar code scanner 118 and POS terminal 116.

The system 100 also includes relay units 120 and ESLs 122. The relay units 120 may be suitably mounted in or near the ceiling of the retail establishment.

ESL software 110 records, schedules, and transmits all messages to ESLs 122. ESL software 110 controls the transmission of messages, including price change messages, to ESLs 122 utilizing relay units 120 which are placed periodically across a retail establishment. These messages are sent to the relay array units 120 through communications link 124. Communications link 124 may suitably utilize radio frequency (RF) communication, infrared (IR) communication, a wired link, or some combination of communication techniques. After receiving a message from the host system 102, the relay units 120 then transmit the message to the ESLs 122 utilizing a further communications link 126, which may suitably utilize RF communication, IR communication, a wired link or some combination of communication techniques. In an alternate embodiment, host system 102 may communicate directly with ESLs 122.

After receiving a message, the ESLs 122 may respond with an acknowledgement which is transmitted to the relay units 120 over communication link 127. The relay units 120 would then retransmit the acknowledgement message to the host system 102 over communication link 124.

Figure 2:
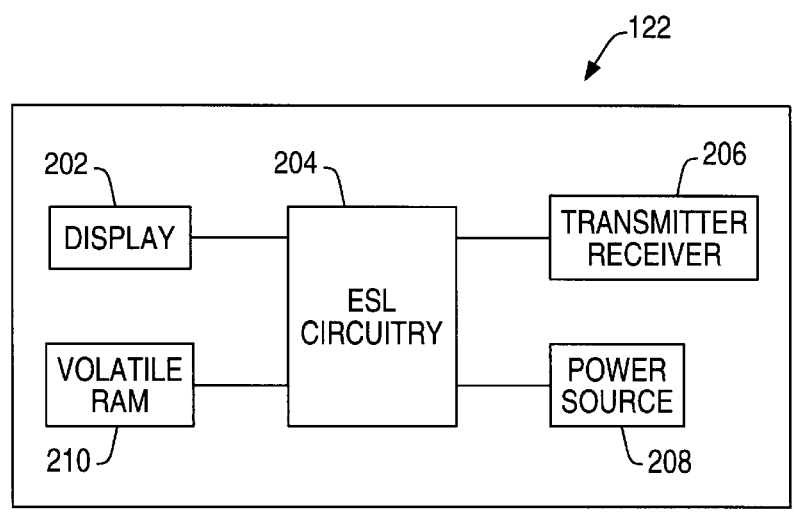
FIG. 2 is a block diagram of an ESL in accordance with the present invention.

FIG. 2 shows a block diagram of the ESL 122 in accordance with the present invention. A display 202 displays information, such as item price and related data. ESL 122 includes a transmitter/receiver 206 for transmitting messages and receiving messages. The transmitter/receiver may utilize RF communication, IR communication, a wired link or some combination of communication techniques. A power source 208 provides power for the operation of ESL 122. The operation of ESL 122 is controlled by ESL circuitry 204. ESL circuitry 204 decodes incoming messages received, and performs any actions indicated by the messages. For example, if a price change message is received, the ESL circuitry 204 would cause the display 202 to be updated with the new price information. Volatile RAM 210 stores the ESL identification number and the displayed message. ESL circuitry 204 may also include a variety of components such as timers and other electronic components. Additionally, ESL circuitry 204 may monitor power source 208 to determine if an adequate power supply is being provided.

Figure 3:
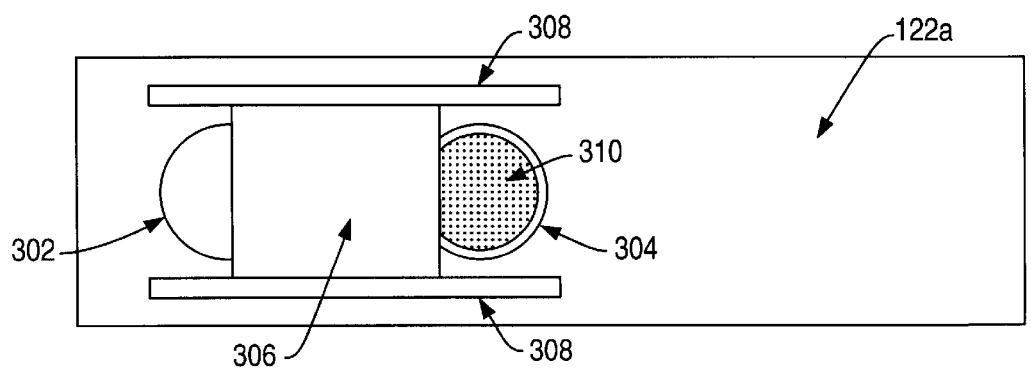
FIG. 3 shows a rear view of a first embodiment of an ESL in accordance with the present invention.

FIG. 3 shows a rear view of a first embodiment of an ESL 122a in accordance with the present invention. The ESL 122a includes a first battery compartment 302 and a second battery compartment 304 which are connected in parallel, allowing power to be supplied to the ESL 122a from a battery in either compartment. A battery door 306 slides within two channels 308 to cover either the first battery compartment 302 or the second battery compartment 304. In a preferred embodiment, the ESL 122a is equipped with only a single battery 310 which may be initially placed in the second battery compartment, for example. In FIG. 3, the battery door 306 is shown in the half-open position for illustration purposes. Normally, the battery door 306 would be positioned over the battery compartment containing the battery 310. Since only a single battery 304 is present during normal operation, the battery door 304 may be half as wide as prior art battery doors, resulting in a cost savings.

When the battery 310 needs to be replaced due to a low charge, with the door 306 covering the battery 310, a user inserts a new battery 310 into the empty battery compartment, slides the battery door 306 over the new battery, and then removes and discards the old battery. By inserting the new battery into the empty compartment before the old battery is removed from the other compartment, power is never removed from the volatile RAM, preserving its contents. To help insure the correct order of steps, the door 306 may include a statement, such as "Insert new battery first", or the like.

Figure 4:
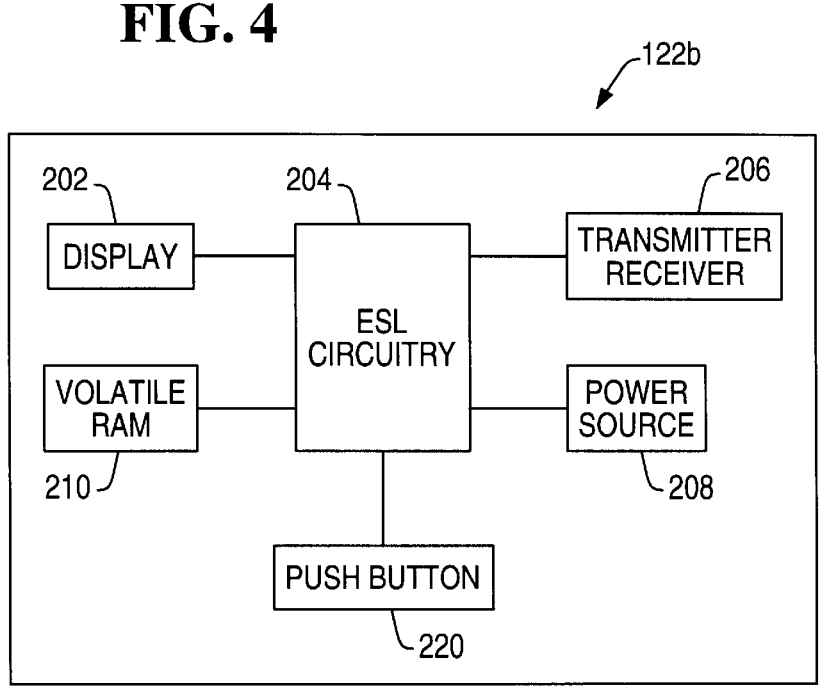
FIG. 4 shows a block diagram of an ESL in accordance with one aspect of the present invention.

In another aspect of the present invention, an ESL 122b displays instructions describing how to properly replace the battery 310. FIG. 4 shows a block diagram of the ESL 122b in accordance with the present invention. The ESL 122b may suitably include all of the same elements as ESL 122a with the addition of a pushbutton 220, or other user input element. When pressed, the pushbutton 220 causes the ESL circuitry 204 to transmit a message to the host system 102. During normal operation, the host system may periodically query the ESL to determine if the battery is low and needs replacement. When the battery 310 needs to be replaced, the host system 102 sends a message to the ESL 122b causing the ESL to display a first message containing a first instruction step describing how to replace the battery. Such a first message may be "Change battery—push button for further instructions", for example.

When the user who will perform the battery replacement pushes the pushbutton 320, the ESL 122b sends a message to the host system 102 providing an indication that the user has pressed the button. The host system then sends a message to the ESL 122b causing the ESL to display a second message containing a second instruction step, such as "Insert new battery into empty compartment and push button to continue", for example. Each incremental button push causes the ESL 122b to display the next instruction in the sequence. For example, the next instruction may be "Move battery door to cover new battery and push button to continue" followed by the succeeding instruction "Remove old battery and push button to continue." Pushing the button after the final instruction causes the ESL 122b to return to displaying normal price information.

Figure 5:
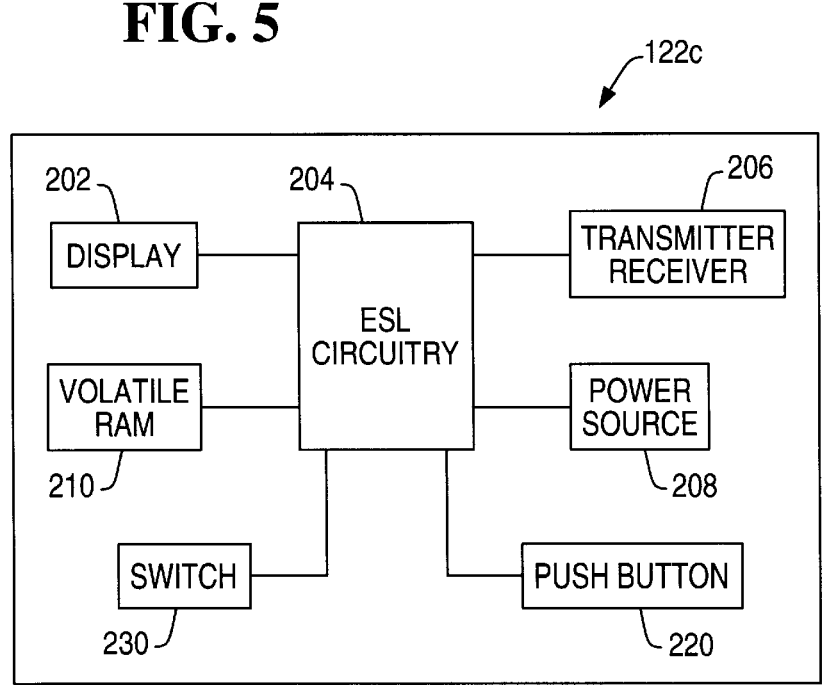
FIG. 5 shows a block diagram of an ESL in accordance with another aspect of the present invention.

In another aspect of the present invention, an ESL 122c, as shown in FIG. 5, may include a switch 230 which is used by the ESL circuitry 204 to detect when the ESL 122c is attached to a shelf rail or other mount. When the ESL circuitry 204 detects that the ESL 122c is detached from its mount and the battery power is low, the ESL 122c begins to display battery change instructions. Rather than receiving the battery change instructions from the host system, these battery change instructions may be stored in RAM or ROM included within the ESL 122c.

Figure 6:
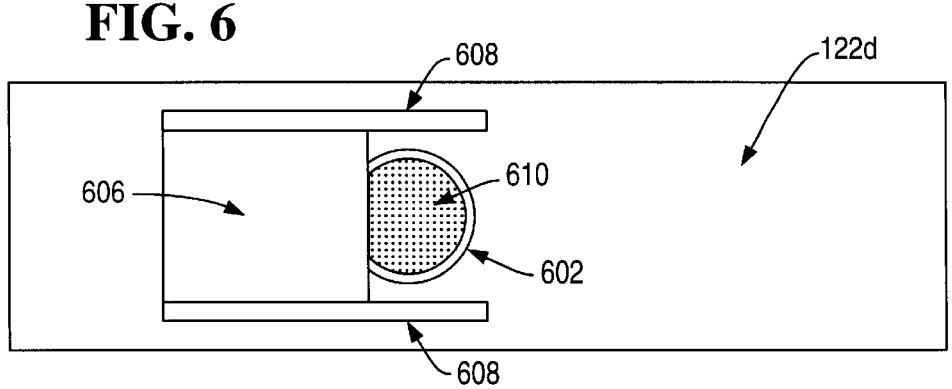
FIG. 6 shows a rear view of a second embodiment of an ESL in accordance with the present invention.
Figure 6A:
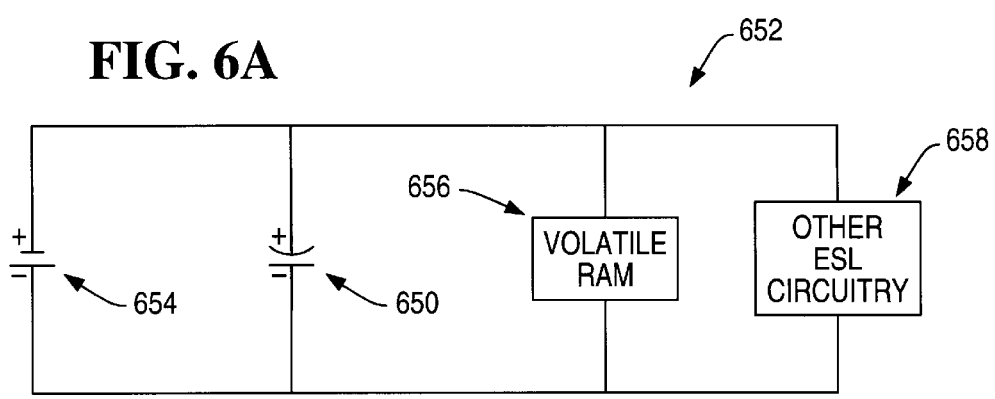
FIG. 6A shows an ESL circuit diagram in accordance with the present invention.

FIG. 6 shows a rear view of a second embodiment of an ESL 122d in accordance with the present invention. The ESL 122d includes a single battery compartment 602. A battery door 606 slides within two channels 608 to cover the battery compartment 602 containing a battery 610. In FIG. 6, the battery door 306 is shown in partially open position for illustration purposes. Normally, the battery door 306 would be positioned over the battery compartment containing the battery 610. As seen in a circuit diagram 652 of FIG. 6A, the ESL 122d includes a capacitor 650 to temporarily maintain the contents of volatile RAM 652 while a single battery 654 is being replaced. The capacitor 650 may be 500 $\mu F$, for example, to allow the contents of the volatile RAM 652 to be maintained for 60 seconds, for example. The battery 654 is connected in parallel with the capacitor 650, the volatile RAM 656, and other ESL circuitry 658.

In a third embodiment of the present invention, advantageous aspects of the first and second embodiments are combined to minimize the chances of losing power during battery replacement. An ESL in accordance with the third embodiment of the present invention includes the two battery compartments with the single battery from the first embodiment, and the capacitor from the second embodiment.

Figure 7:
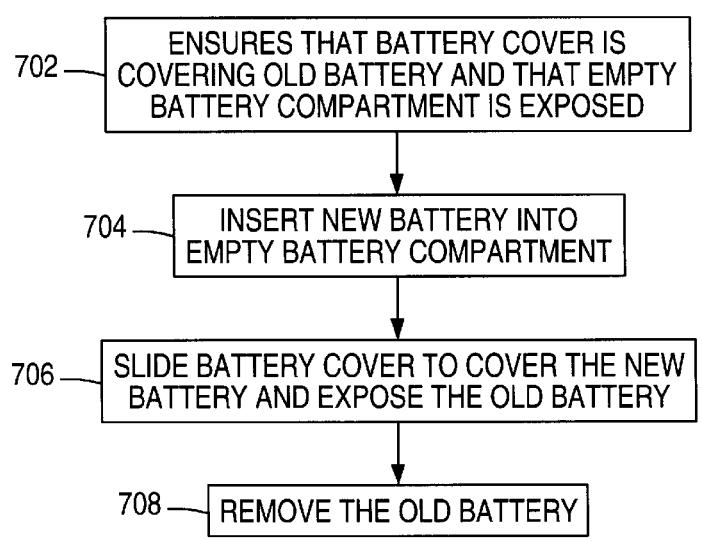
FIG. 7 illustrates a first method of replacing an ESL battery in accordance with the present invention.

FIG. 7 shows a method 700 of replacing an old battery with a new battery in an ESL, such as ESL 122a, in accordance with the present invention. In a first step 702, a user ensures that a battery cover is covering the old battery contained in a first battery compartment, and that a second battery compartment is exposed and empty. In step 704, the user inserts the new battery into the second compartment. In step 706, the user slides the battery cover to cover the new battery. In step 708, the user removes the old battery.

FIG. 8 shows a method 800 of replacing an old battery with a new battery in an ESL in accordance with the present invention. In step 802, the ESL determines if the battery is low. Additionally, the ESL may also determine if the ESL has been removed from its mounting. In step 804, the ESL displays a first instructional message to a user, providing the user with a first step of battery replacement instructions. This message may be read from local ESL memory or transmitted from a host system. In step 806, the user performs the first step of the instructions. In step 808, the user provides an indication to the ESL that the first step has been completed. In a preferred embodiment, step 808 is accomplished by the user depressing a pushbutton. In step 810 the ESL determines if all replacement instructions have been displayed. If all instructions have not been displayed, steps 804–808 are repeated for each additional instruction. If all instructions have been displayed, then in step 812 the ESL begins displaying normal information, such as price information.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

I claim:

1. An electronic shelf label (ESL) comprising:
   a display for displaying information;
   memory circuitry for storing the information displayed and an ESL identification number;
   second memory circuitry for storing battery change instructions;
   a first battery compartment;
   a battery in the first battery compartment;
   a second battery compartment electrically connected in parallel with the first battery compartment;
   a battery cover sized to cover only one of the battery compartments;
   ESL circuitry in the ESL for determining that the battery should be replaced; and
   a switch coupled to the ESL circuitry for detecting removal of the ESL from a mounting;
   wherein the ESL circuitry causes the display to display a battery change instruction if the ESL circuitry determines that the battery should be replaced and the switch detects removal of the ESL from the mounting.

2. The electronic shelf label of claim 1 wherein the battery cover has a first position and a second position, wherein when the battery cover is in the first position the first battery compartment is uncovered and the second battery compartment is covered, and wherein when the battery cover is in the second position the first battery compartment is covered and the second battery compartment is uncovered.

3. The electronic shelf label of claim 1 further comprising two channels slidably engaging the battery cover.

4. The electronic shelf label of claim 1 further comprising ESL communication circuitry for communicating with a host system.

5. The electronic shelf label of claim 4 further comprising a pushbutton for initiating transmission of a message to the host system when the pushbutton is depressed.

6. The electronic shelf label of claim 5 wherein the ESL communication circuitry is for receiving a first message from the host system directing the ESL to display a first battery change instruction.

7. The electronic shelf label of claim 6 wherein the ESL communication circuitry is for receiving a second message from the host system directing the ESL to display a second battery change instruction, wherein the second message is received in response to the pushbutton being depressed.

8. The electronic shelf label of claim 1 further comprising a pushbutton;
   wherein the ESL circuitry causes the display to display a second battery change instruction if the pushbutton is pressed following display of the first battery change instruction.

9. A method of replacing an old battery with a new battery in an electronic shelf label (ESL) comprising the steps of:
   (a) receiving a first battery change instruction from a host system;
   (b) displaying the first battery change instruction by the ESL;
   (c) ensuring that a battery cover is covering the old battery contained in a first battery compartment, and that a second battery compartment is exposed and empty;
   (d) depressing an ESL pushbutton;
   (e) transmitting a message to the host system indicating that step (c) has been completed;
   (f) receiving a second battery change instruction from a host system;
   (g) displaying the second battery change instruction by the ESL;
   (h) inserting the new battery into the second battery compartment;
   (i) moving the battery cover to expose the old battery and cover the new battery; and
   (j) removing the old battery.

10. The method of claim 9 further comprising, before step (i), the steps of:
    depressing the ESL pushbutton; transmitting a message to the host system indicating that step (h) has been completed;
    receiving a third battery change instruction from a host system; and
    displaying the third battery change instruction by the ESL.

11. A method of replacing an old battery with a new battery in an electronic shelf label (ESL) comprising the steps of:
    displaying a first message by the ESL, the first message including a first instruction of an instruction sequence describing how to replace the old battery with a new battery;

performing the first instruction by a user; providing an indication to the ESL that the first instruction has been completed;

displaying a second message by the ESL, the second message including a second instruction of the instruction sequence describing how to replace the old battery with a new battery;

performing the second instruction by the user;

providing an indication to the ESL that the second instruction has been completed.

12. The method of claim 11 further comprising, before the step of displaying a first message, the step of determining that the old battery needs to be replaced with the new battery.

13. An electronic shelf label (ESL) comprising:

a display for displaying information;

memory circuitry for storing the information displayed and an ESL identification number;

ESL communication circuitry for communicating with a host system and for receiving a first message from the host system directing the ESL to display a battery change instruction;

a pushbutton for initiating transmission of a second message to the host system when the pushbutton is depressed;

a first battery compartment;

a second battery compartment electrically connected in parallel with the first battery compartment; and a battery cover sized to cover only one of the battery compartments.

14. The electronic shelf label of claim 13 wherein the battery cover has a first position and a second position, wherein when the battery cover is in the first position the first battery compartment is uncovered and the second battery compartment is covered, and wherein when the battery cover is in the second position the first battery compartment is covered and the second battery compartment is uncovered.

15. The electronic shelf label of claim 13 further comprising two channels slidably engaging the battery cover.

16. The electronic shelf label of claim 13 wherein the ESL communication circuitry is for receiving a third message from the host system directing the ESL to display a another battery change instruction, wherein the third message is received in response to the pushbutton being depressed.

17. An electronic shelf label (ESL) comprising:

a display for displaying information;

a first memory circuitry for storing the information displayed and an ESL identification number;

a second memory circuitry for storing battery change instructions;

an ESL battery;

a first battery compartment;

a second battery compartment electrically connected in parallel with the first battery compartment;

a battery cover sized to cover only one of the battery compartments;

ESL circuitry for determining whether the ESL battery should be replaced and for causing the display to display a first battery change instruction if the battery should be replaced; and a pushbutton;

wherein the ESL circuitry causes the display to display a second battery change instruction if the pushbutton is pressed following display of the first battery change instruction.

* * * * *